US006748348B1

(12) United States Patent
Russell, II

(10) Patent No.: US 6,748,348 B1
(45) Date of Patent: Jun. 8, 2004

(54) DESIGN METHOD FOR NUCLEAR REACTOR FUEL MANAGEMENT

(75) Inventor: William E. Russell, II, Wilmington, NC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/475,309

(22) Filed: Dec. 30, 1999

(51) Int. Cl.[7] .................................................. G06G 7/48
(52) U.S. Cl. ................................. 703/6; 703/1; 700/28
(58) Field of Search ........................... 703/6, 1; 700/28

(56) References Cited

U.S. PATENT DOCUMENTS

| | | | |
|---|---|---|---|
| 4,330,367 A | 5/1982 | Musick | |
| 4,459,259 A | 7/1984 | Colley | |
| 4,552,718 A | 11/1985 | Impink | |
| 4,853,175 A | 8/1989 | Book, Sr. | |
| 4,949,237 A | * 8/1990 | Brich et al. ................... | 700/73 |
| 4,997,617 A | 3/1991 | Newton et al. | |
| 5,009,833 A | 4/1991 | Takeuchi et al. | |
| 5,023,045 A | 6/1991 | Watanabe et al. | |
| 5,091,139 A | 2/1992 | Chao et al. | |
| 5,171,516 A | 12/1992 | Iwamoto | |
| 5,267,346 A | 11/1993 | Maruyama et al. | |
| 5,272,736 A | 12/1993 | Wolters, Jr. et al. | |
| 5,309,485 A | 5/1994 | Chao | |
| 5,311,562 A | 5/1994 | Palusamy et al. | |
| 5,392,320 A | 2/1995 | Chao | |
| 5,438,527 A | 8/1995 | Feldbaumer et al. | |
| 5,530,867 A | 6/1996 | Beran | |
| 5,631,939 A | 5/1997 | Haraguchi et al. | |
| 5,636,328 A | 6/1997 | Kautz et al. | |
| 5,726,913 A | 3/1998 | Grimsrud | |
| 5,781,430 A | 7/1998 | Tsai | |
| 5,790,616 A | 8/1998 | Jackson | |
| 5,790,618 A | 8/1998 | Fawks, Jr. | |
| 5,793,636 A | 8/1998 | Cooney et al. | |
| 5,812,622 A | 9/1998 | Chang et al. | |
| 5,855,009 A | 12/1998 | Garcia et al. | |
| 5,859,885 A | 1/1999 | Rusnica et al. | |
| 5,912,933 A | 6/1999 | Shaug et al. | |
| 5,923,717 A | 7/1999 | Fawks, Jr. | |
| 5,940,816 A | 8/1999 | Fuhrer et al. | |
| 6,031,984 A | 2/2000 | Walser | |
| 6,272,483 B1 | 8/2001 | Joslin et al. | |
| 6,311,313 B1 | * 10/2001 | Camporese et al. ........ | 376/245 |
| 6,345,240 B1 | * 2/2002 | Havens ....................... | 376/217 |
| 6,498,661 B1 | * 12/2002 | Brossman et al. ......... | 358/3.14 |

FOREIGN PATENT DOCUMENTS

| EP | 0 786 782 A1 | 7/1997 |
|---|---|---|
| EP | 0 823 712 A1 | 2/1998 |

OTHER PUBLICATIONS

Handbook of Simulation, by Jerry Banks, John Wiley & Sons, Inc., Aug. 1998, ISBN 0–471–13403–1, pp. 335–336.*

(List continued on next page.)

Primary Examiner—Kevin J. Teska
Assistant Examiner—Eduardo Garcia-Otero
(74) Attorney, Agent, or Firm—Harness, Dickey & Pierce, P.L.C.

(57) ABSTRACT

In the design method for nuclear reactor fuel management, nuclear reactor operation for sets of independent control variable values is simulated to produce associated sets of dependent performance variable values. Transfer functions are generated based on the sets of independent control variable values and the sets of dependent performance variable values. The transfer functions represent relationships between the independent control variables and the dependent performance variables. Additional sets of dependent performance variable values are then generated for additional sets of independent control variable values using the generated transfer functions. A set of independent control variable values for possible use in operating a nuclear reactor is then determined based on the sets of dependent performance variable values and the additional sets of dependent performance variable values.

38 Claims, 13 Drawing Sheets

OTHER PUBLICATIONS

CRC Handbook of Mathematical Sciences, 5th Edition, William H. Beyer, CRC Press, 1985.*

"Effectiveness of BWR Control Rod Pattern Sampling Capability in the Incore Fuel Management Code FORMOSA–B", Karve et al, *M&C '99*, Sep., 1999, Madrid Spain, pp. 1459–1468.

Shiratori Yoshitake, "Expert System Supporting Preparation of Planning for Fuel Replacement", 04132995, published May 7, 1992, Japanese Patent Abstract.

Hamida, S. Ben et al. "The need for improving the exploration operators for constrained optimization problems." Proc. Of the 2000 Congress on Evolutionary Computation, San Diego, USA, 1989.

Michalewicz, Zbigniew et al. "Genocop III: A Co–evolutionary Algorithm for Numerical Optimization Problems with Nonlinear Constraints." Proc. Second IEEE Intl. Conf. Evolutionary Computation, D.B. Fogel (ed). IEEE Press, pp. 647–651, 1991.

Schoenauer, Marc et al. "Evolutionary Computation at the Edge of Feasibility." Proc. $4^{th}$ Conf. Parallel Problems Solving from Nature, W. Ebeling and H.–M. Voigt (eds.), Springer–Verlag, pp. 573–580, 1996.

Bäck, Thomas et al. "A Survey of Evolution Strategies." Proc. $4^{th}$ Intl. Conf. Genetic Algorithms, R.K. Belew and L.B. Booker (eds.), Morgan Kauffman, pp. 2–9, 1991.

Joines, Jeffrey A. et al. "On the Use of Non–Stationary Penalty Functions to Solve Nonlinear Constrained Optimization Problems with GA's." Proc. $1^{st}$ IEEE Intl. Conf. Evolutionary Computation, D.B. Fogel (ed.) IEEE Press, pp. 579–584, 1994.

Eiben, A. E. et al. "SAW–ing EAs: adapting the fitness function for solving constrained problems." *New Ideas in Optimization*. McGraw–Hill, London, D. Corne, M. Dorigo, F. Glover (eds.), pp. 389–402, 1999.

Coit, David W. et al. "Adaptive Penalty Methods for Genetic Optimization of Constrained Combinatorial Problems." INFORMS Journal on Computing, 8(2): 173–182, 1996.

Moore, Brian R. et al. "FORMOSA–B: A Boiling Water Reactor In–Core Fuel Management Optimization Package." Nuclear Technology, vol. 126, pp. 153–169, May 1999.

Karve, A.A. et al. "FORMOSA–B: A Boiling Water Reactor In–Core Fuel Management Optimization Package II," *Nucl. Technol.*, 131, 48–68 (2000).

Hadj–Alouane, A.B. et al. "A Genetic Algorithm for the Multiple–Choice Integer Program." Operations Research, 45 (1), pp. 92–101, 1997.

Homaifar, A. et al. "Constrained Optimization via Genetic Algorithms" Simulation 62 (4), pp. 242–254, 1994.

* cited by examiner

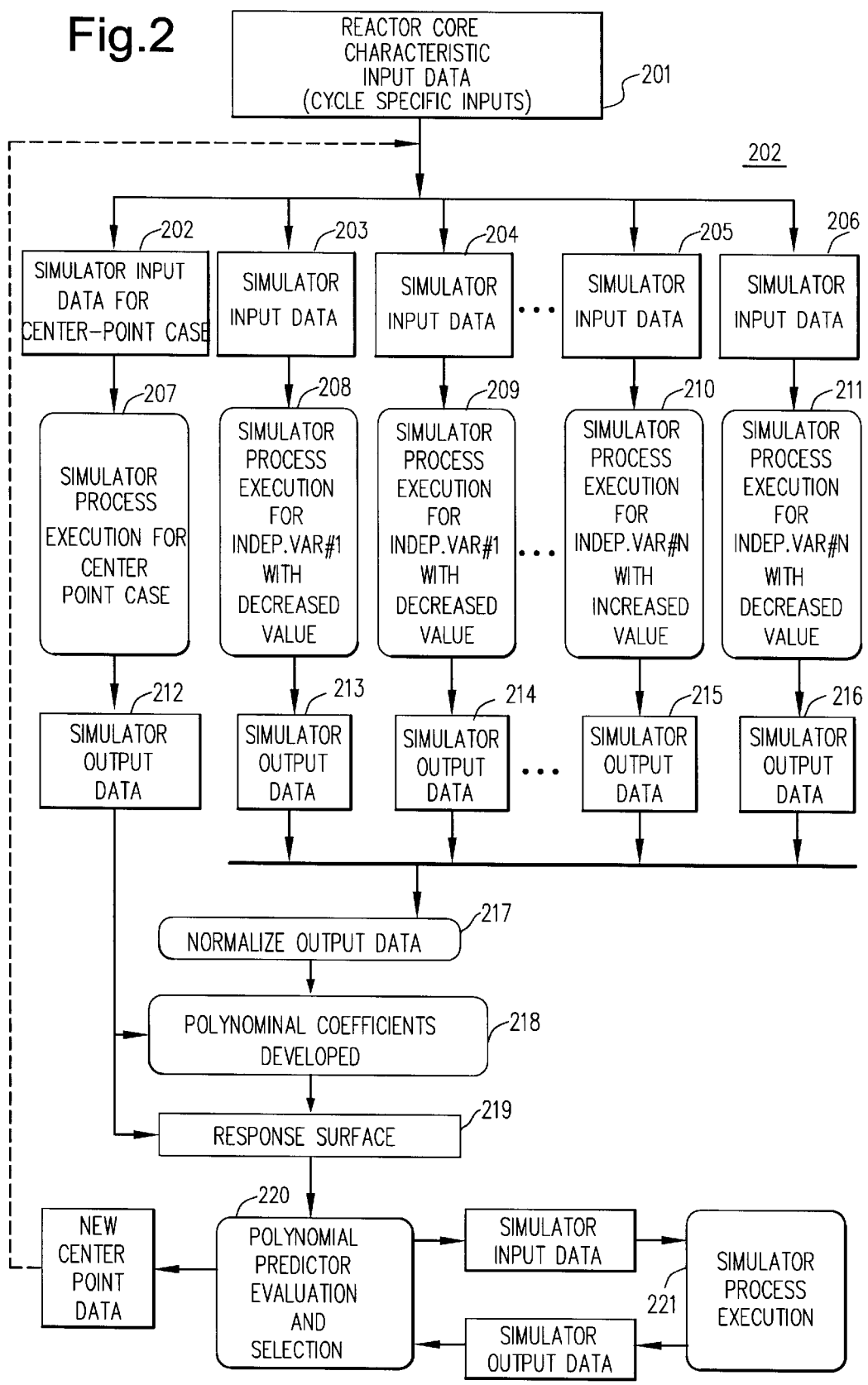

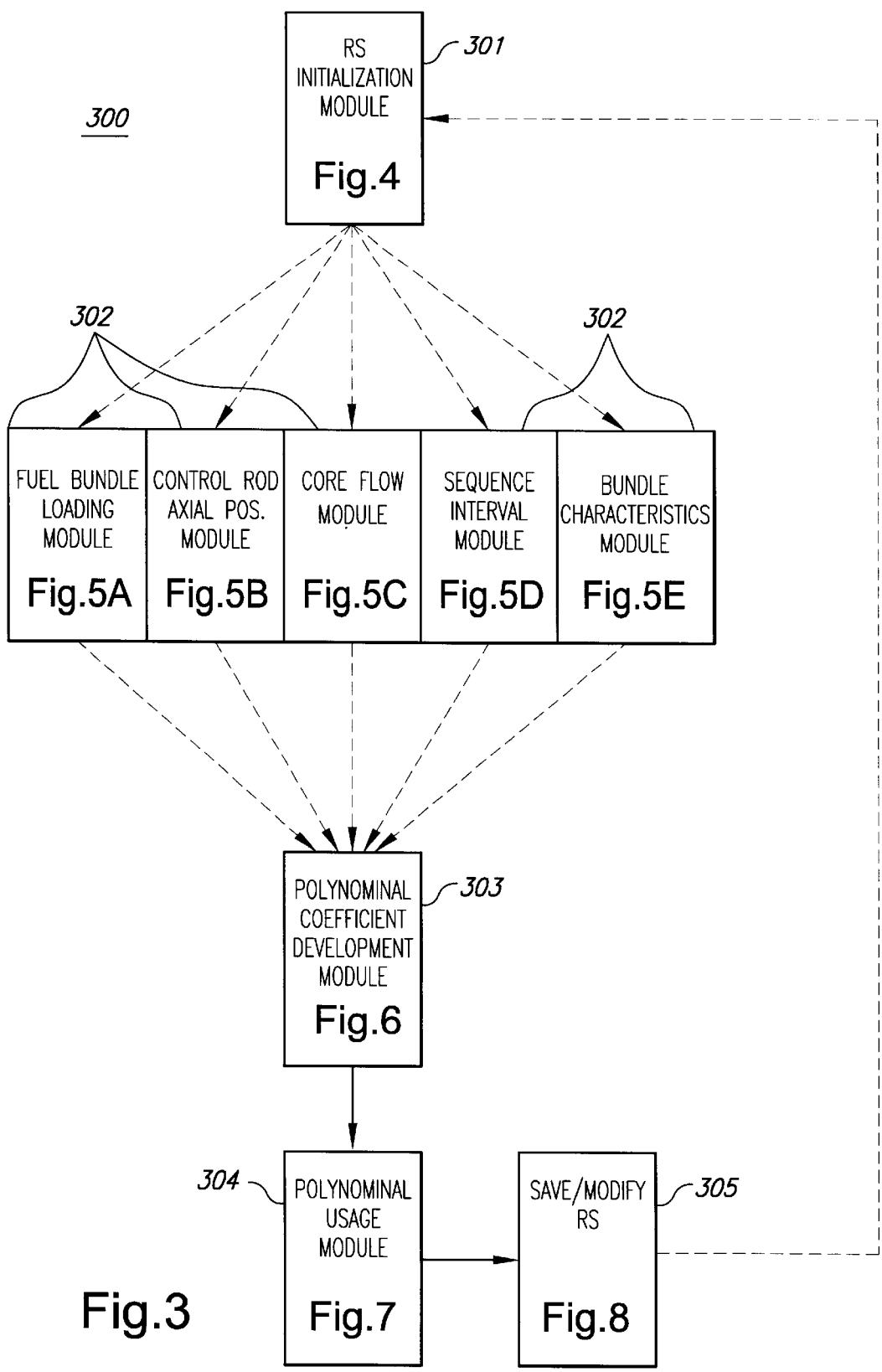

DESIGN METHOD FOR NUCLEAR REACTOR FUEL MANAGEMENT

This invention generally concerns nuclear reactor fuel-cycle design and management.

BACKGROUND OF THE INVENTION

A nuclear reactor core includes many individual components that have different characteristics that may affect a strategy for efficient operation of the core. For example, a nuclear reactor core has many, e.g., several hundred, individual fuel assemblies (bundles) that have different characteristics and which must be arranged within the reactor core or "loaded" so that the interaction between fuel bundles satisfies all regulatory and reactor design constraints, including governmental and customer specified constraints. Similarly, other controllable elements and factors that affect the reactivity and overall efficiency of a reactor core must also be taken into consideration if one is to design or develop an effective control strategy for optimizing the performance of a reactor core at a particular reactor plant. Such "operational controls" (also referred to herein as "independent control-variables") include, for example, various physical component configurations and controllable operating conditions that can be individually adjusted or set. Besides fuel bundle "loading", other sources of control variables include "core flow" or rate of water flow through the core, the "exposure" and the "reactivity" or interaction between fuel bundles within the core due to differences in bundle enrichment, and the "rod pattern" or distribution and axial position of control blades within the core. As such, each of these operational controls constitutes an independent "control-variable" that has a measurable effect on the overall performance of the reactor core. Due to the vast number of possible different operational values and combinations of values that these independent control-variables can assume, it is a formidable challenge and a very time consuming task, even using known computer-aided methodologies, to attempt to analyze and optimize all the individual influences on core reactivity and performance.

For example, the number of different fuel bundle configurations possible in the reactor core can be in excess of one hundred factorial. Of the many different loading pattern possibilities, only a small percentage of these configurations will satisfy all of the requisite design constraints for a particular reactor plant. In addition, only a small percentage of the configurations that satisfy all the applicable design constraints are economically feasible. Moreover, in addition to satisfying various design constraints, since a fuel bundle loading arrangement ultimately affects the core cycle energy (i.e., the amount of energy that the reactor core generates before the core needs to be refueled with new fuel elements), a particular loading arrangement needs to be selected that optimizes the core cycle energy.

In order to furnish and maintain the required energy output, the reactor core is periodically refueled with fresh fuel bundles. The duration between one refueling and the next is commonly referred to as a "fuel-cycle" or "core-cycle" of operation and, depending on the particular reactor plant, is on the order of twelve to twenty-four (typically eighteen) months. At the time of refueling, typically one third of the least reactive fuel are removed from the reactor and the remaining fuel bundles are repositioned before fresh fuel bundles are added. Generally, to improve core cycle energy higher reactivity bundles should be positioned at interior core locations. However, such arrangements are not always possible to achieve while still satisfying plant-specific design constraints. Since each fuel bundle can be loaded at a variety of different locations relative to other bundles, identifying a core loading arrangement that produces optimum performance of the core for each fuel-cycle presents a complex and computation-intensive optimization problem that can be very time consuming to solve.

During the course of a core-cycle, the excess energy capability of the core, defined as the excess reactivity or "hot excess", is controlled in several ways. One technique employs a burnable reactivity inhibitor, e.g., Gadolinia, incorporated into the fresh fuel. The quantity of initial burnable inhibitor is determined by design constraints and performance characteristics typically set by the utility and by the NRC. The burnable inhibitor controls most, but not all, of the excess reactivity. Consequently, "control blades" (also referred to herein as "control rods")—which inhibit reactivity by absorbing nuclear emissions—are also used to control excess reactivity. Typically, a reactor core contains many such control blades which are fit between selected fuel bundles and are axially positionable within the core. These control blades assure safe shut down and provide the primary mechanism for controlling the maximum power peaking factor.

The total number of control blades utilized varies with core size and geometry, and is typically between 50 and 150. The axial position of the control blades (e.g., fully inserted, fully withdrawn, or somewhere in between) is based on the need to control the excess reactivity and to meet other operational constraints, such as the maximum core power peaking factor. For each control blade, there may be, for example, 25 or more possible axial positions and 25 "exposure" (i.e., duration of use) steps. Considering symmetry and other requirements that reduce the number of control blades that are available for application at any given time, there are more than 6 million possible combinations of control blade positions for even the simplest case. Of these possible configurations, only a small fraction satisfy all applicable design and safety constraints, and of these, only a small fraction are economical. Moreover, the axial positioning of control blades also influences the core cycle energy that any given fuel loading pattern can achieve. Since it is desirable to maximize the core-cycle energy in order to minimize nuclear fuel cycle costs, developing an optimum control blade positioning strategy presents another formidable independent control-variable optimization problem that must also be taken into consideration when attempting to optimize fuel-cycle design and management strategies.

Traditionally, reactor fuel-cycle design and management, including core loading and control blade positioning determinations as well as optimization strategies concerning other variable operational controls, are determined on a "trial-and-error" basis based primarily on the past experiences of the reactor core design engineers. Due to circumstances that require a rapid response to changing plant operating conditions, a core design engineer may be faced with the formidable challenge of specifying values for over 200 independent control-variables within a very short time frame. The impact, for example, of a particular suggested core loading arrangement or a control blade positioning arrangement on reactor performance over the duration of a core-cycle is usually determined by individual computer simulations. If a particular design constraint is not satisfied by an identified arrangement, then the arrangement is modified and another computer simulation is run. Because of the relatively long computer simulation time required for assessing the impact of a change in the value of even a single given independent control-variable, man-weeks of human and computer resources are typically required before an appropriate fuel-cycle design is identified using this procedure. Moreover, using this trial-and-error approach, once a fuel-cycle design arrangement that satisfies all design and safety constraints has been identified, it may turn out that the identified arrangement may not provide the actual maximum cycle-energy. Therefore, this trial-and-error process must continue until the engineers believe that an optimum fuel-cycle design for the core has been identified. In practice, however, it is very possible that a particular core arrangement that is not consistent with the engineers' past experience may be the actual optimum fuel-cycle design for the core. Such an actual optimum core arrangement, however, may not necessarily be identified through the above described trial and error process.

Since operational control strategy problems generally are considered unique to each reactor plant, no known algorithm has provided a viable solution for identifying optimum operational control strategies. In addition, expert systems have not been applied on a broad basis since a standard set of rules typically are not really applicable over the wide range of situations characteristic of the many different reactor plants and types currently in commercial operation. Few methodologies have been developed which can significantly reduce the time required to identify a fuel bundle loading arrangement or identify a control blade positioning arrangement that optimizes cycle energy and satisfies design constraints for a wide range of reactors. At least one methodology applicable to a wide range of reactors for identifying optimum control blade positioning arrangements was developed and is the subject of commonly assigned U.S. Pat. No. 5,790,616 to Jackson, issued Aug. 4, 1998.

Similar methodologies have been developed for identifying optimum core fuel bundle loading arrangements. See, for example, commonly assigned U.S. Pat. No. 5,923,717 to Fawks, Jr., issued Jul. 13, 1999 and U.S. Pat. No. 5,790,618 to Fawks, Jr., issued Aug. 4, 1998. For the most part, the above methodologies employ a single processor or computer system to execute a specific program routine that simulates the reactor operating conditions under a selected component arrangement/configuration of fuel bundle locations or control blade axial positions and then the arrangement is optimized by systematically or stochastically evaluating possible alternatives. Subsequent to analyzing each position or location, random arrangements are created and compared with the then best case arrangement identified. Another example is a recent methodology for boiling water reactor (BWR) incore fuel management optimization that uses a 3-D core simulation computer program called FORMAOSA-B. (See "FORMOSA-B: A BWR Incore Fuel Management Optimization Package" by B. R. Moore, P. J. Turinski and A. A. Karve, Nuclear Technology, 126, 153 (1999)). An enhanced version of the FORMAOSA-B code has a limited fuel loading pattern optimization capability through the use of a stochastic optimization technique called "simulated annealing". (See the paper entitled "Effectiveness of BWR Control Rod Pattern Sampling Capability in the Incore Fuel Management Code FORMOSA-B" by A. A. Karve and P. J. Turinski presented at the conference on "Mathematics and Computation, Reactor Physics and Environmental Analysis in Nuclear Application," published September 1999, SENDA EDITORIAL, S.A.).

Unfortunately, the above-described methodologies are only applicable for optimizing a single or a few operational control-variables at a time such as, for example, fuel bundle loading pattern or control blade position. Moreover, the above methodologies fail to address the optimization of other important operational control-variables such as fuel bundle enrichment, blade sequence interval, core water flow, and other independent control-variables that may also be critical to quality and performance. Consequently, it would be highly desirable to have an efficient optimization methodology and apparatus that is broadly applicable over a wide range of reactor plant types and which is capable of identifying the best possible fuel-cycle core design and in-core fuel management strategy in light of all the intrinsic operational control-variables as well as the many different specific constraints and considerations that may be critical to quality for the operation of a particular reactor plant.

BRIEF SUMMARY OF THE INVENTION

An embodiment of the present invention provides a system and method for optimizing multiple operational control-variables of a nuclear reactor to identify an optimum fuel-cycle design and develop an operational management strategy. In one aspect, the present invention is a networked computer system including one or more computers programmed to execute a nuclear reactor simulation program and having at least one computer programmed to determine the most appropriate values for selected control-variables that result in the optimal physical configuration for operating the reactor core over one or more refueling cycles. In another aspect, the present invention is a method for efficiently determining optimized values for the operational control-variables that effect the performance of a nuclear reactor core—an operational control-variable being the "controllable" physical aspects of the reactor, such as fuel bundle loading, control rod pattern, core flow, etc., the characteristics of which define the physical configuration and operational constraints of a particular reactor core. Rather than relying on random or stochastic search techniques or rule-based techniques in an attempt to reduce the size of the "search" space, the optimization method of the present invention performs a deterministic and exhaustive -search for an optimum solution.

In an example embodiment of the invention, a plurality of several thousand performance parameters—also referred to herein as "dependent" variables because of their dependence upon the setting or values of the various operational control-variables—are utilized as a measure of determining reactor core performance. These "performance parameters" include but are not limited to parameters conventionally used to gauge reactor core performance, such as critical power ratio (CPR), shutdown margin (SDM), maximum average linear heat generation rate (MAPLHGR), maximum fraction of linear power density (MFLPD), Hot excess, etc. Many of the performance parameters analyzed are both spatially and time dependent, such as, for example, MAPLHGR, MFLPD, and minimum critical power ratio (MCPR). Consequently, the present invention must be capable of analyzing several thousands of such "dependent" variables. To accomplish this, an exemplary embodiment of the present invention utilizes a plurality of processors to conduct separate computer simulations covering the operation of the reactor core throughout one or more fuel cycles to determine how changes to many different control-variables affect the performance of the core as measured by the respective performance parameters. Preferably, these reactor core simulations are conducted utilizing a computer program capable of performing three-dimensional (3-D) physics modeling of reactor core operation (i.e., the simulator program should be capable of handling three-dimensional control variables).

The method of the present invention significantly decreases the number of required simulations—and hence increases the overall computational efficiency—by mapping the results of a relatively few number of reactor core computer simulations to second-order polynomials. The polynomials are then subsequently used to predict quantitative values for performance parameters (i.e., the dependent variables) over a selected limited range (i.e., "breadth") of quantitative values or settings for one or more selected control-variables (i.e., the independent variables). Consequently, each polynomial "predictor" effectively saves the processing time that would be required to actually run computer simulations for the many discrete quantitative values that a particular control-variable might assume within a selected range or "breadth" of possible control-variable values. Each of these polynomial predictors are defined in terms of a unique set of coefficient values that are stored in a multidimensional data array in a host computer memory. In this manner, the data array serves as a type of virtual "response surface" for cataloging and analyzing the results of many different simulation cases, based on a 3-D physics modeling of the core, in terms of polynomials indicative of reactor performance that are represented by the polynomial coefficients.

Using the polynomial predictors, quantitative values for performance parameters are determined for discreet control-variable values at selected predetermined increments over the breadth of possible values for each control-variable. Each performance parameter value is then compared using a conventional "objective function", which sets limiting values for each performance parameter, to determine the best set of control-variable polynomial predictors for optimizing core performance. As an option, a particular optimization "resolution" level may be selected wherein the combined effect of a change in two or more control-variables is analyzed. In that instance, predicted values for the two or more performance parameters are combined to generate a net-change or "superposition" value indicative of the core simulation that would likely result. A corroborating reactor core simulation is then conducted using the best predicted value(s) obtained for each control-variable to provide corroboration of the polynomial predictors and to calibrate the polynomial coefficient data in the response surface with the simulation process.

The method of the invention presented herein can be practiced using most any type of computer network or interconnected system of processors having sufficient processing speed and associated data storage capacity and is not necessarily intended to be limited to any particular type of data processor or network. Moreover, the software system of the present invention, including one or more software modules, may be embodied on a computer-readable medium for transport between and/or installation on one or more processors/computers or networked computer systems. In addition, the method and system presented herein are believed to be applicable toward optimizing the fuel-cycle design and operation of many different types of reactor plants including both boiling water reactors (BWRs) and pressurized-water reactors (PWRs).

BRIEF DESCRIPTION OF THE DRAWINGS

FIG. 2 is a data flow diagram illustrating the basic data flow between processes in an example embodiment of a software system for implementing the reactor core multiple control-variable optimization method of the present invention;

FIG. 3 is a block diagram illustrating an example embodiment of a software system for implementing the reactor core multiple control-variable optimization method of the present invention;

DETAILED DESCRIPTION OF THE INVENTION

The following description is directed toward a presently preferred embodiment of the present invention, which may be operative as an end-user application running, for example, under the Microsoft® Windows 95/NT environment. The present invention, however, is not limited to any particular computer system or any particular environment. Instead, those skilled in the art will find that the system and methods of the present invention may be advantageously applied to environments requiring management and/or optimization of any multiple control-variable critical industrial/scientific process or system, including chemical and mechanical process simulation systems, pressurized water reactor simulation systems, boiling water reactor simulation systems, and the like. Moreover, the invention may be embodied on a variety of different platforms, including UNIX, LINUX, Macintosh, Next Step, Open VMS, and the like. Therefore, the description of the exemplary embodiments which follows is for purposes of illustration and not limitation.

Figure 1A:
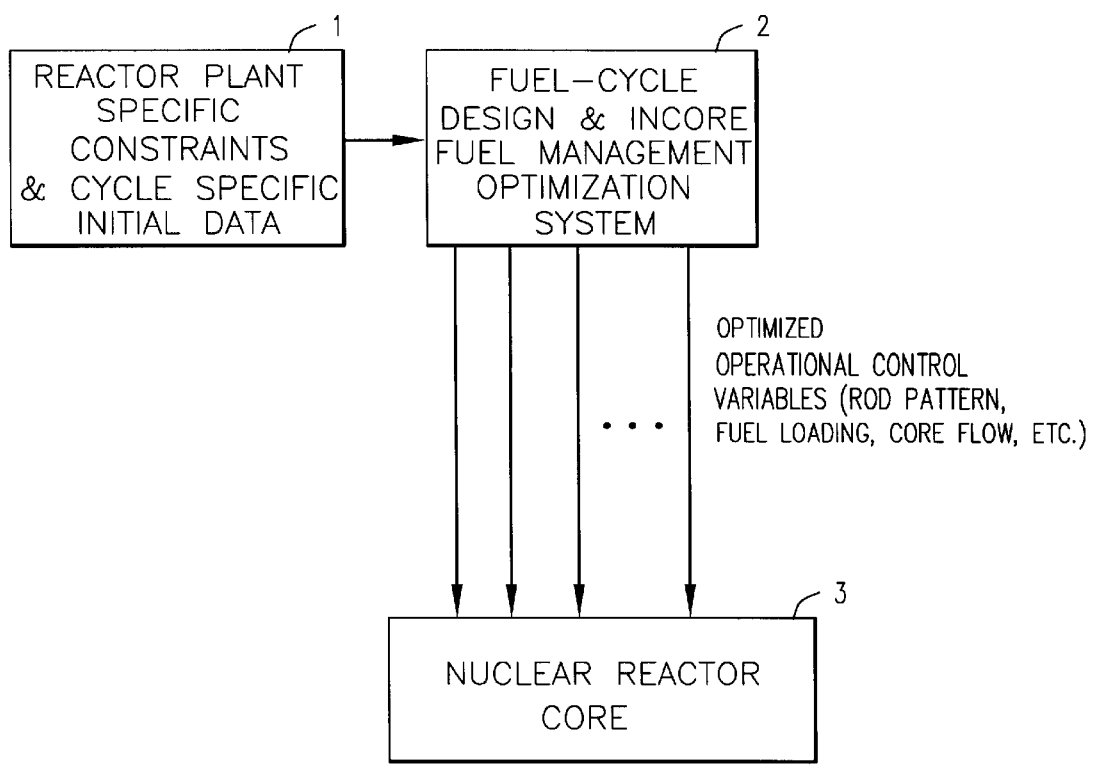
FIG. 1A is a block diagram illustrating a system for the optimization of multiple operational control-variables for a nuclear reactor.

Referring first to FIG. 1A, a block diagram illustrates an example system embodiment of the present invention for optimization of multiple operational control-variables for a nuclear reactor. Reactor plant specific design constraints and cycle specific initial data, 1, defining a particular reactor core, 3, are provided as input data to the optimization system 2 of the present invention. Optimized values for operational control variables (e.g., rod pattern, fuel loading, core flow, etc.) are provided as outputs for use in the design and management of the nuclear reactor core.

Figure 1B:
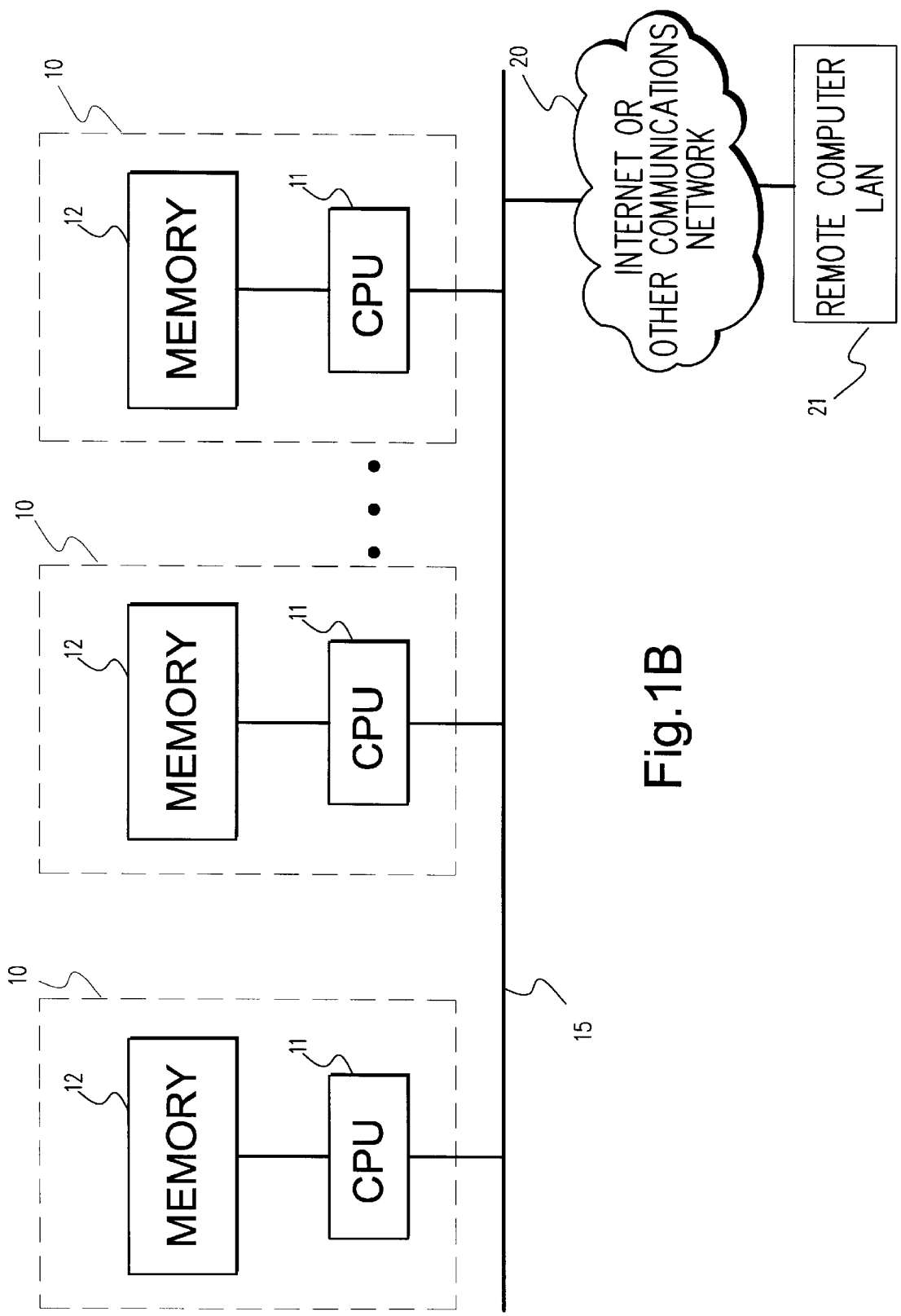
FIG. 1B is a schematic illustration of an example network arrangement of independent processors in which the present invention may be embodied.

Referring to FIG. 1B, an example computer network arrangement is shown on which the optimization method of the present invention may be embodied. A plurality of general purpose computers/processors 10 are coupled to a local area communications network (LAN) 15 which may itself be coupled to one or more distinct open or private access network(s) 20 for communications with one or more remote computers 21. In a preferred embodiment, the multiple control-variable optimization method of the present invention is implemented via software modules resident on at least one of computers 10. As explained below, the modules may be distributed among computers 10 or may be resident on one or more of computers 10 (and 21) that communicate via LAN 15 and/or network(s) 20.

As represented in FIG. 1B, communications network 15 and/or 20 can be an open network, such as the Internet, or a private access network, such as a local area network (LAN) or a wide area network (WAN). General purpose computers 10 are coupled directly or via a modem to network 15 and consist of independent processor 11 with or without dedicated memory 12 in addition to conventional I/O and user interface components (not shown). Computers 10 can be any of a variety of high speed processors, for example, a VMS-Alpha computer system, a Legacy computer system, a high-speed work station or a high-speed IBM-compatible personal computer (such as a desk-top or laptop Pentium III processor system). Communications over the networks 15 and 20 can be accomplished using any preferred combination of conventional and proprietary protocols that facilitates efficient inter-processor communications such as, for example, the PCP/IP protocol.

Two or more of computers 10 (21), preferably systems that are capable of supporting the execution of appropriate software for the simulation of nuclear reactor core operations, are coupled via some communications link(s) such as LAN 15 and/or network 20 for exchanging data files and control information. Most any conventional reactor core simulation program (or suite of programs), such as for example, GE's "PANACEA" 3-D reactor core simulation program, may be used in conjunction with the present invention. This type of simulator program is capable of processing three-dimensional variables defining the core. An input file containing values for selected "independent" reactor control-variables (e.g., fuel loading, rod pattern, core flow, etc.) is provided as an input and the simulator program provides an output file comprising values for selected performance parameters (i.e., reactor core "dependent" variables, such as CPR, SDM, MAPLHGR, MFLPD, etc.) that are indicative of the state of the reactor core at a plurality of discrete intervals (i.e., each and every "exposure step") throughout one or more core refueling cycles.

Referring now to FIG. 2, the basic functional processes and data flow within an example software system 200 for implementing the multiple control-variable optimization method of the present invention are described. Information concerning a selectable "resolution" level (explained in greater detail below), other processing options and the reactor core cycle-specific input data information is preferably input by the user at an initial stage (not shown). A cycle-specific reactor core profile input file 201, containing reactor core characteristics and operational critical-to-quality constraints specific to a particular reactor plant for a particular fuel-cycle, is built from this user-input information. The cycle-specific input data is used to identify initial independent control-variable values which define an initial "center-point" data case for a particular reactor. This center-point data is provided as an input data file 202 to a reactor core simulation program (actual simulation program not shown). A reactor core operation simulation 207 is conducted using the center-point data. For example, a three-dimensional (3-D) analysis core simulation is performed on a selected "host" computer 10. When the simulation process is complete, a center-point case simulation output data file 212 is produced. The center-point case simulation output data from this file is then stored in a multidimensional array within the digital storage memory of the selected "host" computer 10 and is used as the basis for creating a type of virtual "response surface" 219 for evaluating the reactor performance for different control-variable values.

Next, separate simulations of the same reactor core operating under different physical conditions and constraints represented by predetermined changes in independent variable values for selected operational control-variables are conducted contemporaneously by the software system. Different simulator input data files 203–206 are created, each reflecting a change in value for a selected control-variable, and each input file is submitted to an independent reactor core simulator program or process 208–211 resident on one or more independent computers or processors (10,21) connected via the communications network (15,20). After performing a core simulation based on the values in the received input file, each simulator process returns an output data file 213–216 reflecting the resultant output values of the dependent variables (e.g., CPR, MFLPD, MAPRAT, Hot Excess, SDM) of the reactor core. Once all of the reactor core simulations for each of the independent variable cases 208–211 are complete, the data from simulator output files 213–216 is normalized as indicated at block 217, for example, by dividing each data item by output data obtained from the original "center-point" case 212.

After all the simulation case output data is normalized, the normalized data for each independent control-variable case is mapped to a set of corresponding second-order polynomials. In other words, second-order polynomials, each of which is characterized by a set of associated polynomial coefficients, are selected to fit the simulation output data obtained in a few limited number of reactor core simulations e.g., three simulations are preferably used for evaluating each independent control-variable: a center-point case and two variation cases wherein the center-point case quantitative value for the particular control-variable is respectively incremented and decremented. The polynomials are then utilized as "predictors" to project quantitative values of selected performance parameters for each control-variable. Coefficients which uniquely define each polynomial are developed from the normalized simulator output data, as indicated at block 218, using conventional algorithmic techniques for solving second-order polynomials. This normalized coefficient data is stored in an area of computer memory defined herein as the "response surface", as represented by block 219. Basically, response surface 219 contains the dependent variable (performance parameter) "response" of the reactor to individual or combined changes in values of the control-variables. In this manner, the response surface serves as sort of a cyber-workspace and data-array repository for storing the resultant reactor core simulation output data from different case simulations for multiple independent control-variables.

Next, all polynomials for each control-variable are evaluated 220 and a best polynomial predictor is selected. As discussed in further detail with respect to the Polynomial Optimization And Evaluation Module and FIG. 7, another simulation process 221 is conducted using control-variable values provided by the selected best polynomial predictor to evaluate the modified values. If an improvement in reactor performance is indicated by the simulation results, the modified control-variables are accepted as an improvement over the initial center-point case. This new combination of independent variables is then re-defined as the new center-point case and the entire control-variable evaluation process is again repeated (as indicated by the dotted line in FIG. 2) until no further significant improvements are realized. Once it is determined that no further improvements are obtainable, the response surface is refined using a smaller (more limited) range for control-variable values and the above steps are repeated. The optimization process as a whole is considered essentially completed when no further improvements to the control-variables are discernible and no feasible reduction to the range of control-variable values can be made.

In FIG. 3, an overview of an example software system 300 for implementing the multiple control-variable optimization method of the present invention is illustrated in terms of functionally related sections or "modules" with references to separate accompanying FIGS. 4–8 that show example functional program control steps for each module in greater detail. One or more modules of software system 300, including the software system in its entirety, may be embodied on a computer-readable medium for ease of distribution and installation on one or more processors or networked computer systems. Although sections of functionally related software are described herein in terms of component software modules that may be individually or collectively executed by separate processors, the software system of the present invention need not necessarily be limited to a modular component implementation. As indicated in FIG. 3, an example embodiment of software system 300 includes a Response Surface Initialization Module 301, one or more Control-variable Modules 302, a Polynomial Coefficient Development Module 303, a Polynomial Usage Module 304 and a Response Surface Save/modify Module 305. A modular arrangement of the functionally related software within software system 300 enhances the overall flexibility and applicability of the software system to different environments by facilitating the use or omission of different Control-variable Modules (FIGS. 5A–5E) as desired or appropriate for a particular application and, moreover, facilitates the adding of new and different or updated Control-variable Modules.

Response surface initialization module 301 is basically responsible for accepting operator-inputted data describing operating conditions and constraints for a given reactor core (e.g., initial core loading, rod pattern, etc.) and creating a starting point or "center-point" simulation case for normalizing response surface 219. Control-variable modules 302 each contain program control steps for creating simulation case data for specific types of reactor core control-variables such as, for example, fuel bundle loading, control rod position, core flow, sequence change locations, bundle characteristics, etc. For each independent control-variable type, there may be many independent variable cases to consider. Furthermore, for each independent variable case considered by a particular control-variable module there are at least two core simulations run from which response data is obtained: one simulation is performed using the center-point simulation case values with the independent variable value increased by a predetermined amount and another simulation is performed using the center-point simulation case values with the independent variable value decreased by a predetermined amount. The difference between the increased and decreased simulation input values for a particular control-variable is referred to as the range or "breadth" of the control-variable and, since all simulation case results are stored in the response surface, it is also referred to herein as the "breadth" of the response surface (with respect to that control-variable). Each simulation case result includes the values for all of the operational performance parameters (dependent variables) modeled within the core simulation process. Ultimately, the response surface contains at least three core simulation case results for each independent variable case: the center-point case response and two variation case responses created by the particular control-variable module.

Control-variable modules 302 are preferably executed sequentially using a single computer/processor 10 in the LAN. Additional control-variable modules (not shown here) crafted toward particular reactor plant-specific considerations may also be used. The control-variable modules 302 may be executed in any order and any single one or several control-variable modules may be used (as indicated by the dotted lines in FIG. 3) depending on the various critical-to-quality considerations and degree of improvement to reactor performance that may be desired. Simulator input data files containing control-variable values are created by each control-variable module and submitted to other computers/processors in the LAN (or remote network 21) that have resident core simulator programs. Once a simulation case is completed by a processor, it creates a simulator output data file containing the resultant values and sends the file to the computer maintaining the response surface. Since reactor core simulations are typically very time consuming, this distributed processing arrangement allows many different core simulation cases to proceed more or less contemporaneously, thereby greatly reducing the overall elapsed time expended on core simulations. Alternatively, different control-variable modules could also be resident on different independent computers connected within a LAN, WAN or via other communications links. For example, in such an embodiment, response surface initialization module 301 residing on one computer would place a request over the LAN for the execution of a particular desired control-variable module to another computer on which that module resides and then would forward the center-point case data from the response surface.

Polynomial coefficient development module 303 contains program control code for mapping the core simulation results for each independent variable case to unique second-order polynomial curves corresponding to each performance parameter (i.e., the operational "dependent" variables). The coefficient values of each polynomial are determined such that each polynomial fits the data from the three simulation cases for its corresponding performance parameter. Polynomial usage module 304 contains program control code for exploring changes to values of each control-variable, as well as changes to combinations of control-variables considered together, and determining which changes produce the greatest impact on core performance. Since running a core simulation is time consuming, the polynomials are used as fast predictors (relative to the 3-D simulator execution) to determine performance parameter values over the input breadth of a control-variable in lieu of running a core simulation. The control-variable(s) having the greatest performance impact are determined by reiteratively comparing predicted performance parameter values against a predetermined objective function. Finally, a Save/modify module 305 contains program control code for saving and documenting the response surface and outputting quantified optimum control-variable operational values or, alternatively, modifying the response surface if it is determined that results can be further improved by reducing the "breadth" of the response surface (explained in greater detail below).

Figure 4:
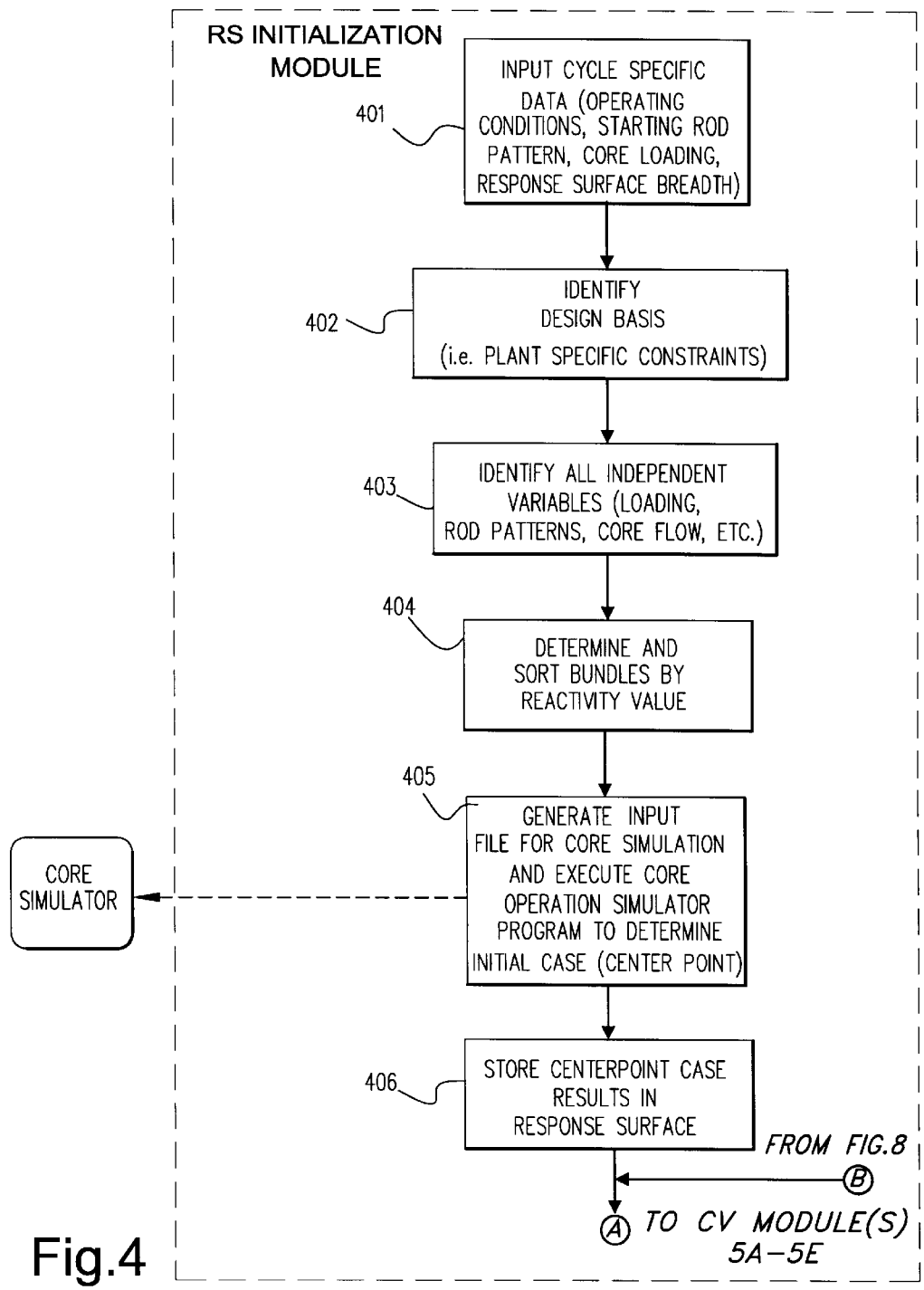
FIG. 4 is a flowchart illustrating functional program control steps performed by a response surface initialization module in an example software embodiment of the present invention.

Referring now to FIG. 4, a flow chart illustrates example functional steps performed by response surface initialization module 301. The first few initial steps 401–404 basically acquire and identify information needed to create an initial center-point simulation case. At step 401, cycle specific reactor core operating condition data including initial values for control-variables (i.e., initial control rod pattern, initial core loading arrangement, etc.) and an initial response surface breadth is specified via operator-input. At step 402, specific operational constraints which form the design basis of a particular reactor plant are identified from the acquired operator-input information—such design basis and constraint information aids in the evaluation of an "objective function", discussed below, that is used to compare the relative quality of alternative solutions. In addition, the computer operator may select an input option, discussed in greater detail below with respect to the Polynomial Optimization And Evaluation Module and FIG. 7, that permits the effects on reactor performance of a change in the operational value of two or more control-variables to be considered in combination.

At step 403, the particular independent control-variables (core loading, rod pattern, core flow, sequence exchange, bundle characteristics, etc.) that are to be considered during the optimization are identified based on the acquired operator-input information. At step 404, the fuel bundles to be used within the core are identified and sorted according to reactivity value. Next, at step 405, a core simulation input data file for producing a center-point simulation case is generated and submitted to a resident (or remote) core simulation program. Once the simulation is finished, the results of the simulation are returned in a simulation output file. At step 406, a multidimensional array is created in memory as a simulation "response surface" and data from the simulation output file is stored there as an initial center-point case.

Next, one or more control-variable modules 302 are executed to develop simulation case data for variations in values for specific control-variables. The execution of more than one control-variable module is optional. Additional control-variable specific modules (not disclosed herein) may also be included as desired. As previously mentioned, the individual control-variable modules may be executed sequentially by a single processor or run contemporaneously on different computers within the LAN or WAN. As the execution of each control-variable module results in adding more simulation case data to the response surface, the accuracy of the present method and the potential reactor performance optimization achievable by the present invention is correspondingly enhanced.

Figure 5A:
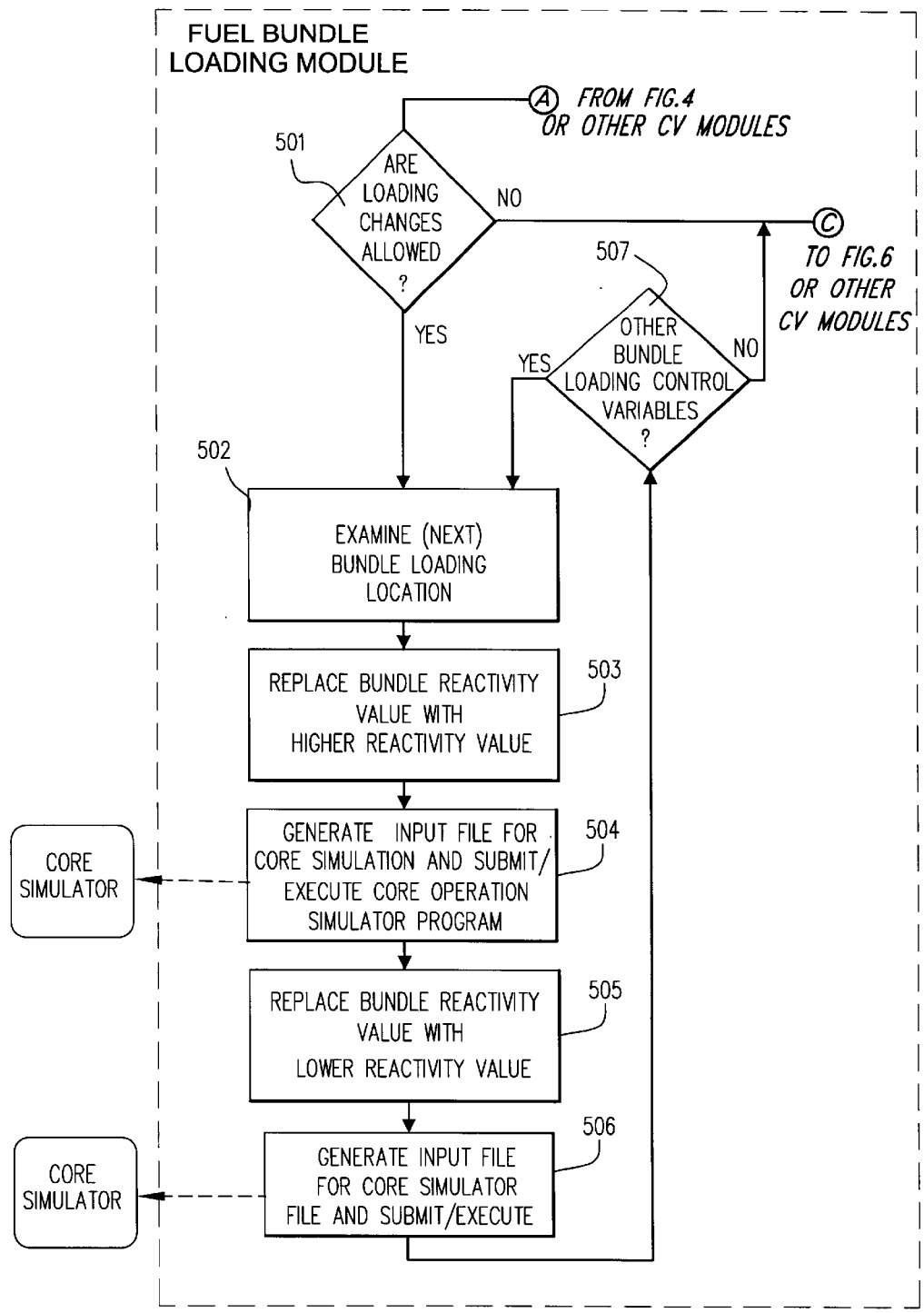
FIG. 5A is a flowchart illustrating functional program control steps performed by a fuel bundle loading module in an example software embodiment of the present invention.

Referring to FIG. 5A, the functional steps performed by an example control-variable module for fuel bundle loading are discussed first. The fuel bundle loading module examines changes in reactor performance parameters caused by changes in the fuel bundle position or loading arrangement. Conventionally, most reactor cores are octant-symmetric and, consequently, only bundle arrangements within one octant of the core need be considered. However, octant symmetry is not a requirement of the process. As indicated at step 501, it is first determined if fuel bundle loading changes are allowed given the pre-identified constraints for the particular reactor. If bundle loading changes are not allowed, program control is passed to another module. If bundle loading changes are allowed, all permissible bundle locations are systematically considered by repeating steps 503 through 507 for each different location, as indicated by block 502.

At step 503, the known reactivity value of the bundle at the selected location is changed to a predetermined higher value. A new core simulation input file is then generated—the input file reflecting the change in fuel bundle reactivity value and a shuffling of the remaining fuel to minimize any reactivity differences relative to the center point. The core simulation input file is then submitted to an available processor/computer 10 for simulation processing, as indicated at step 504. (Although core simulation input files reflecting a "rodded depletion" are generally intended and preferred in the present example embodiment, non-rodded depletion type simulator input files could also be used with the present method.) Without waiting for the results of the submitted core simulation, the bundle reactivity value for the same location is changed, at step 505, to a value lower than the original reactivity.

The combined amount of increase and decrease exacted to the value for a particular control-variable, as described herein with respect to the various control-variable modules, is predetermined according to the particular control-variable being considered and defines the range or "breadth" of values for which the control-variable is examined.

Next, at step 506, a new core simulation input file having the changed reactivity value is again generated and submitted to any available processor/computer 10 for processing another simulation. In an example embodiment of the present invention, once the simulation cases in steps 504 and 506 are completed, output data parameters from each simulation can be normalized to the center point, fit to polynomials and stored to common response surface 219, for example, by each processor/computer performing the core simulation. If changes in reactivity values for fuel bundles at other locations have not yet been simulated, without necessarily waiting for the core simulations of previous steps to complete, a new bundle location is selected and steps 503–506 are again repeated until all allowable bundle locations have been considered, as indicated at step 507. Ultimately, once all the independent control-variable cases for fuel bundle reactivity variations have been considered, processing may continue under control of another module.

Figure 5B:
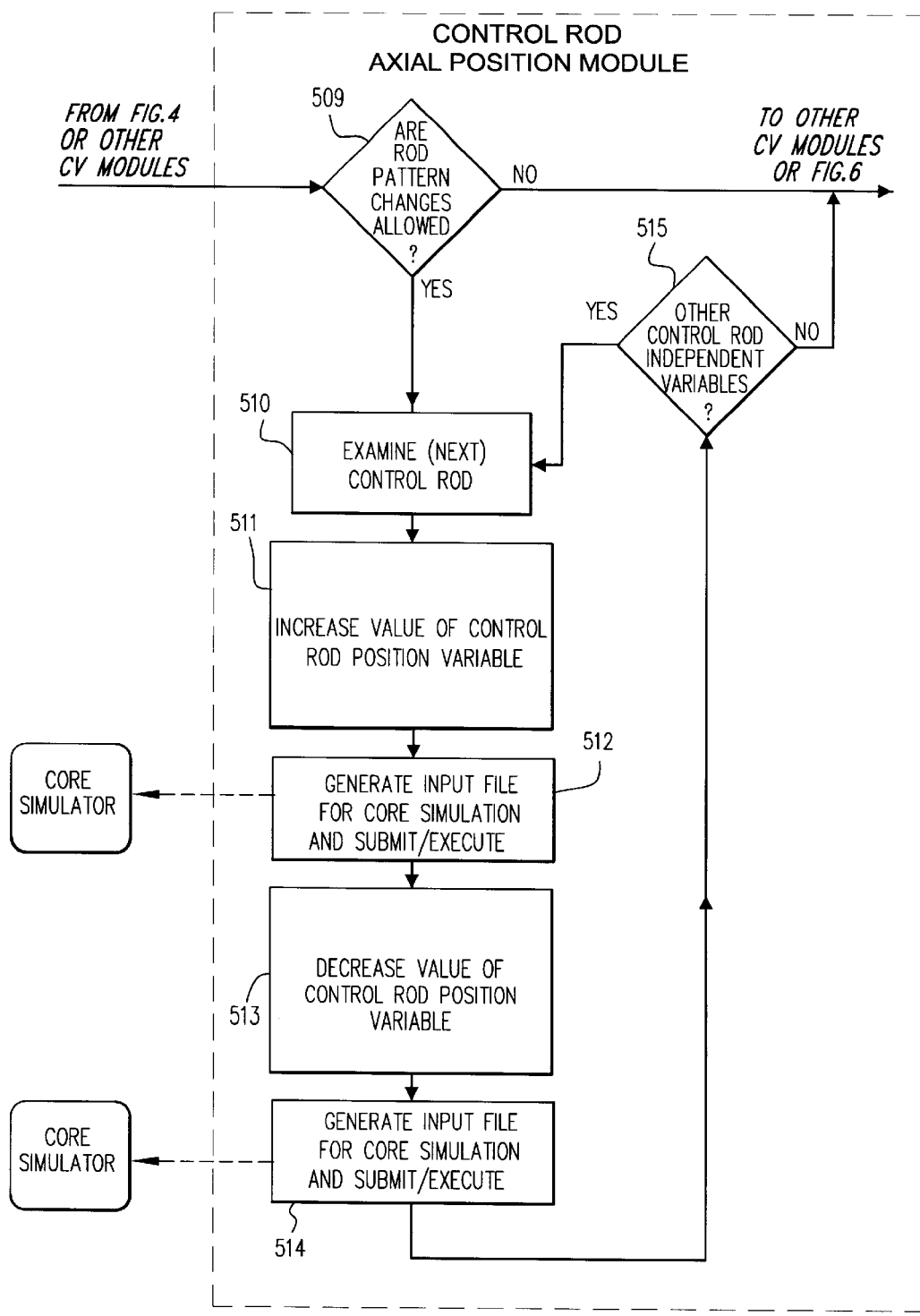
FIG. 5B is a flowchart illustrating functional program control steps performed by a control rod axial positioning module in an example software embodiment of the present invention.

FIG. 5B shows program control steps performed by an example control-variable module for the exploring the different axial positions of the control rods. In a manner similar to the fuel bundle loading module of FIG. 5A, two simulation cases for each control rod are developed and the simulation results are added to the common response surface. At step 509, it is first determined if control rod pattern changes are allowed given the pre-identified constraints for the reactor. If control rod pattern changes are not allowed, program control is passed to another module. If control rod changes are allowed, a predetermined control rod is selected for analysis, as indicated at step 510. Next, at step 511, the initial position value of the selected control rod is increased by a predetermined amount such that the amount of the increase does not violate the physical boundaries of the core or the specified user limits. A new core simulation input file, having only the selected control rod position value changed, is then generated and submitted to an available processor/computer 10 for simulation processing, as indicated at step 512.

At step 513, the control rod position value for the same control rod is changed to a value less than the original position as was done in step 511. Next at step 514, a new core simulation input file having the changed position value is again generated and submitted to an available processor/computer 10 for processing a second simulation case. As indicated at step 515, if changes in position values for other control rods are to be simulated, a new control rod is selected and steps 511–514 are again repeated until all control rods have been considered. As with the fuel bundle loading module, each step in control rod positioning module may proceed without necessarily waiting for the core simulations of previous steps to complete. Finally, once all the independent control-variable cases for control rod position variations have been considered, processing may continue under control of another module.

Figure 5C:
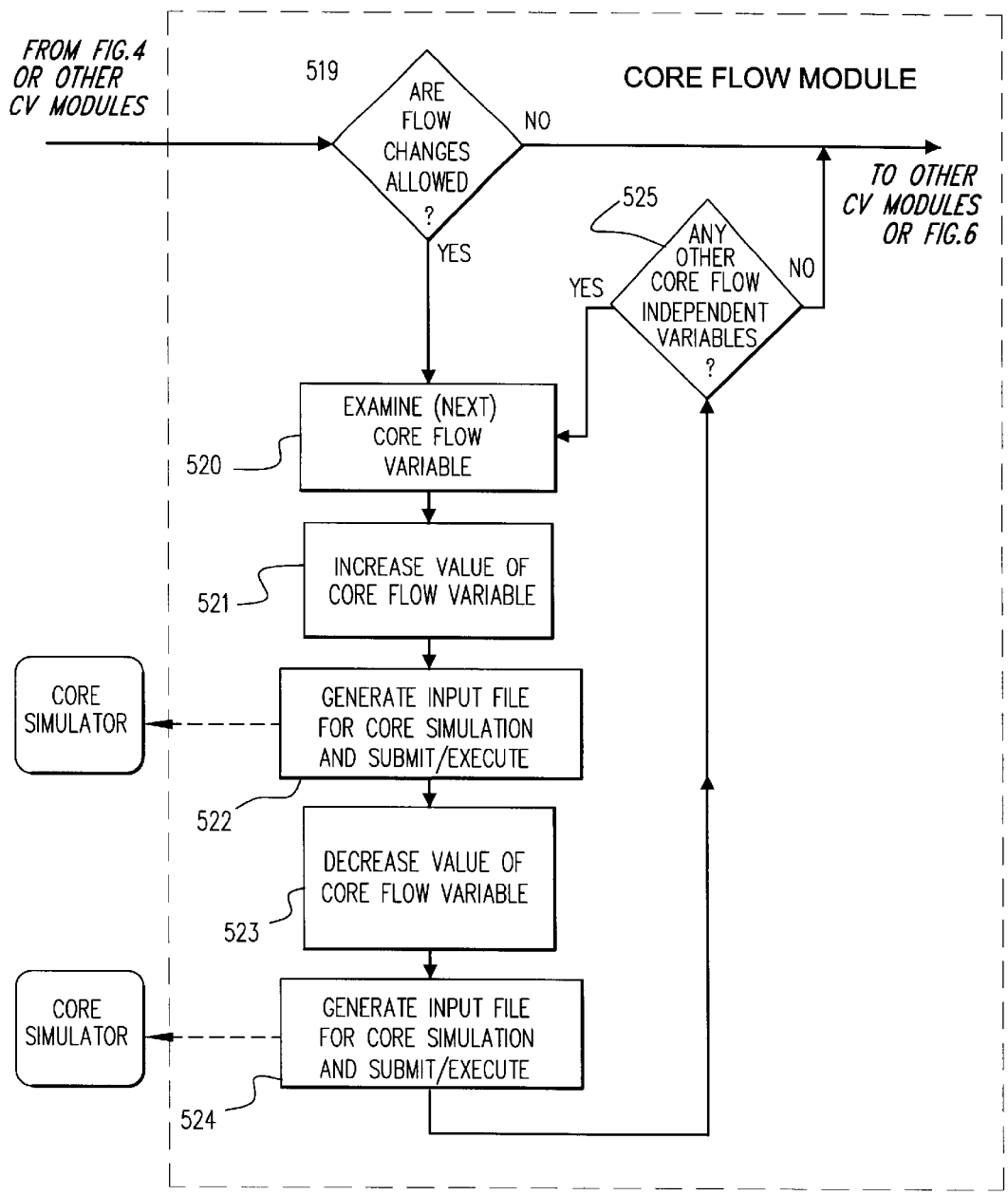
FIG. 5C is a flowchart illustrating functional program control steps performed by a core flow module in an example software embodiment of the present invention.

FIG. 5C shows program control steps performed by an example control-variable module for developing the response surface from changes in the core flow. In a manner similar to the other independent control-variable modules of FIGS. 5A and 5B, two simulation cases for each core flow control-variable are developed and added to the common response surface. At step 519, it is first determined if core flow changes are allowed given the pre-identified constraints for the reactor. If core flow changes are not allowed, program control is passed to another module. If core flow changes are allowed, a particular core flow variable is selected for analysis, as indicated at step 520. Next, at step 521, the initial center-point case value of the selected core flow variable is increased by a predetermined amount. A new core simulation input file, having only the selected core flow variable value changed, is then generated and submitted to an available processor/computer 10 for simulation processing, as indicated at step 522.

At step 523, the core flow value for the same core flow variable is changed to a value less than the original value similar to step 521. Next at step 524, a new core simulation input file having the changes core flow value is again generated and submitted to an available processor/computer for processing a second simulation case. As indicated at step 525, if changes in core flow values for control other core flow variables have not yet been simulated, the next independent core flow variable is selected and steps 521–524 are again repeated until all independent core flow variables have been considered. As with the other control-variable modules discussed above, each step in this module may proceed without necessarily waiting for the core simulations of previous steps to complete. Finally, once all the independent control-variable cases for core flow variables have been considered, processing may continue under control of another module.

Figure 5D:
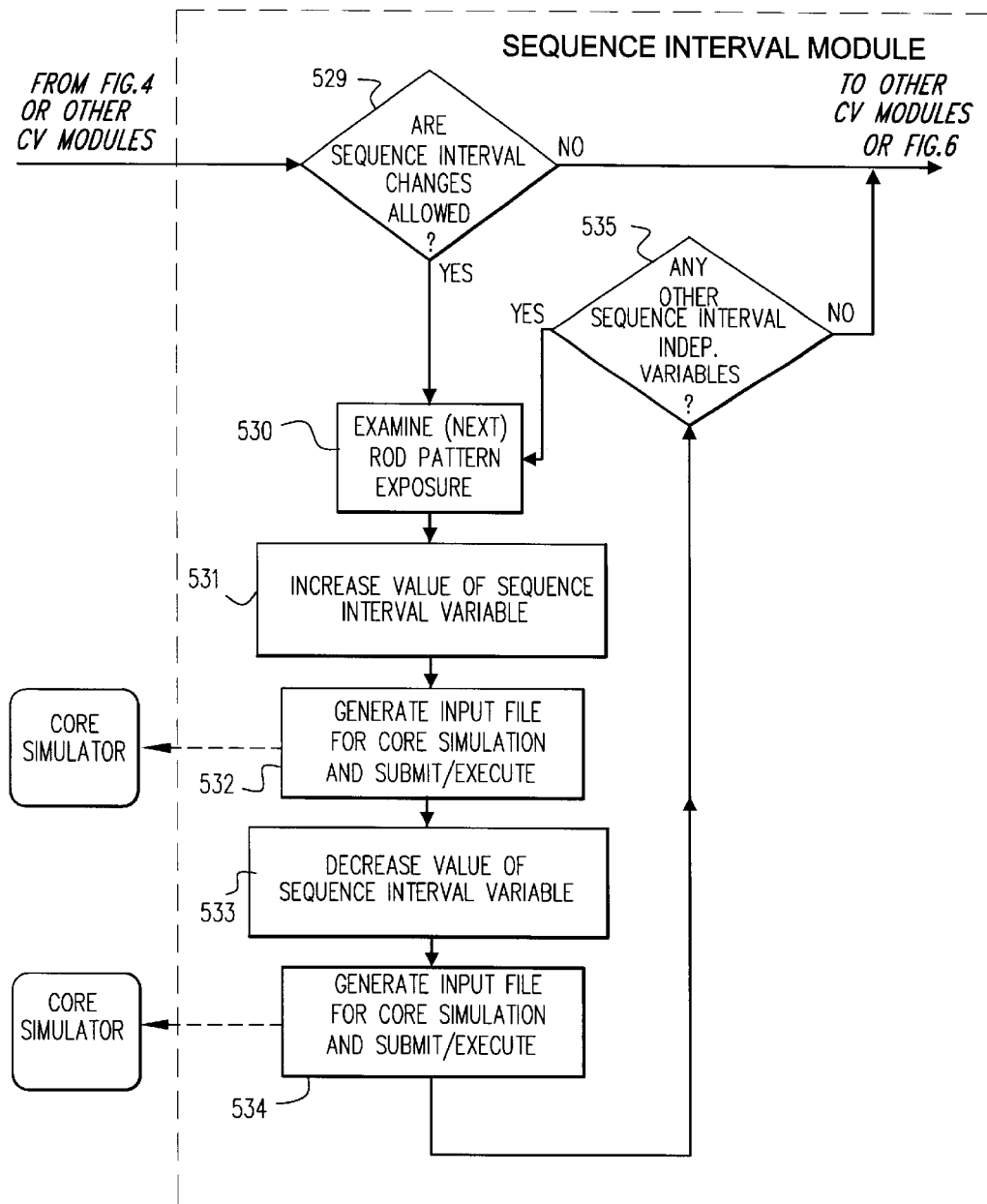
FIG. 5D is a flowchart illustrating functional program control steps performed by a sequence interval module in an example software embodiment of the present invention.

FIG. 5D shows program control steps performed by an example control-variable module for developing the response surface from changes in sequence interval. In a manner similar to the other control-variable modules, two simulation cases for each fuel bundle are developed and added to the common response surface 219. At step 529, it is first determined if sequence interval changes are allowed given the pre-identified constraints for the reactor. If changes are not allowed, program control is passed to another module. If changes are allowed, a particular sequence interval is selected for analysis, as indicated at step 530. Next, at step 531, the initial center-point case sequence interval value for the selected sequence interval is increased by a user specified amount. A new core simulation input file, having only the selected sequence interval value changed, is then generated and submitted to an available processor/computer 10 for simulation processing, as indicated at step 532.

At step 533, the sequence interval value for the same fuel bundle is changed to a value less than the original value similar to 531. Next at step 534, a new core simulation input file having the changed position value is again generated and submitted to an available processor/computer for processing a second simulation case. As indicated at step 535, if changes in values for other sequence interval variables have not yet been simulated, a new bundle is selected and steps 531–534 are again repeated until all other relevant independent sequence interval variables have been considered. As with the other control-variable modules, each step in this module may proceed without necessarily waiting for the core simulations of previous steps to complete. Finally, once all the independent control-variable cases for the sequence interval variables have been considered, processing may continue under control of another module.

Although the modules depicted in FIGS. 5A through 5D together demonstrate the ability of the present optimization method to consider independent control-variables that are capable of having values that are considered as "continuous" in nature, such as, for example, loading parameters, rod pattern parameters, flow parameters, and sequence exchange parameters, etc., the method of the present invention can also be used to consider changes in "discrete" value control-variable, such as bundle characteristics. An example control-variable (CV) module for considering discrete-value type control-variables is provided using the context of fuel bundle characteristics as illustrated in FIG. 5E.

Figure 5E:
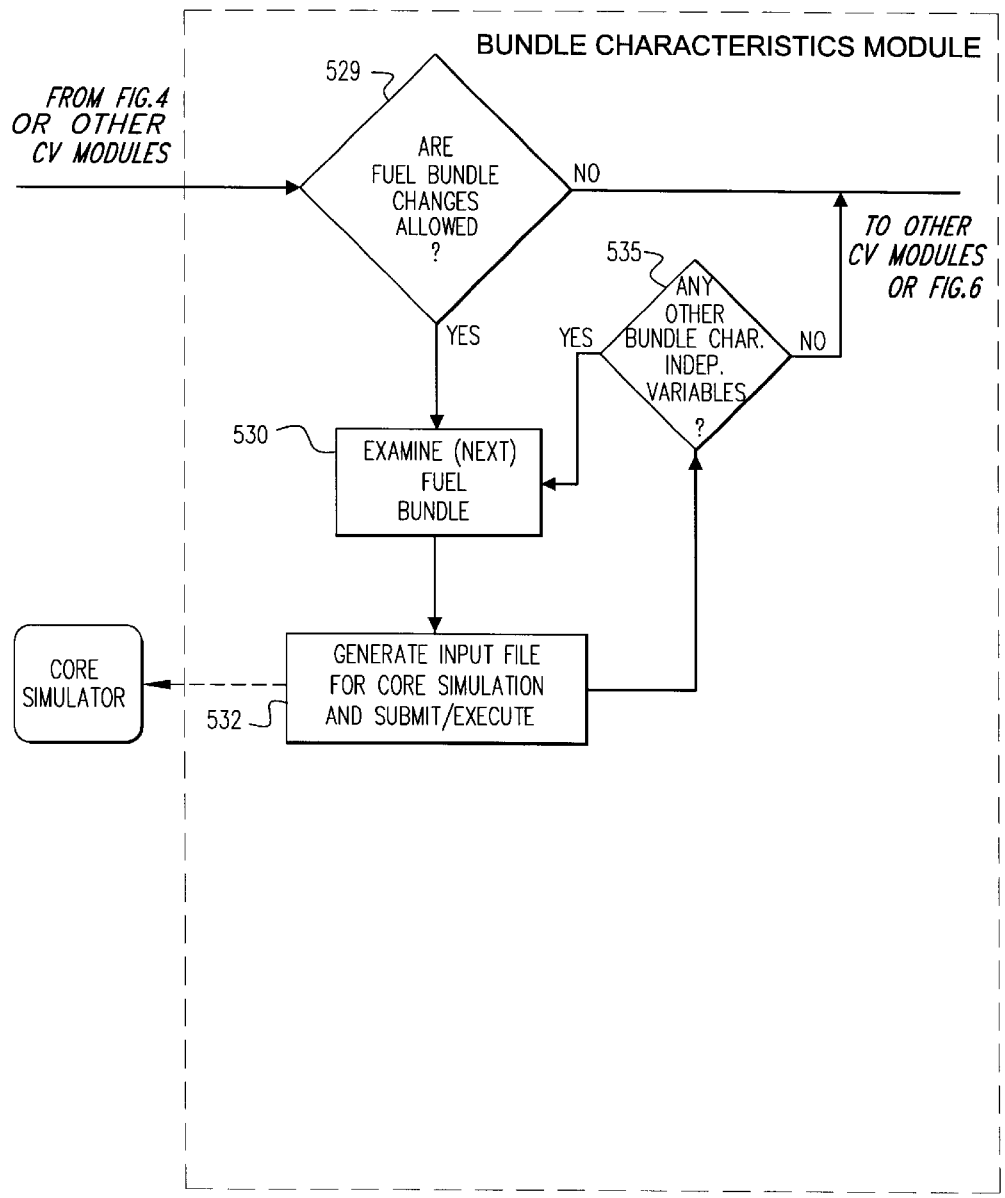
FIG. 5E is a flowchart illustrating functional program control steps performed by a fuel bundle characteristics module in an example software embodiment of the present invention.

Referring now to FIG. 5E, example program control steps for developing reactor simulation response data from changes in bundle characteristics are described. Fuel bundle characteristics, in this example, can represent any fuel bundle having differences in axial enrichment (e.g., axial Gadolinium variations). Like the previously discussed modules, core simulator cases are generated and executed for each independent control-variable. Upon completion of each independent control-variable, the dependent variable output information is normalized to the relative center-point. However, instead of mapping the response to polynomials, the response is mapped to linear functions. Once all control-variable modules 302 and corresponding simulation cases have finished execution and response surface 219 has been completed, simulation case data stored in the response surface is mapped to polynomials.

Figure 6:
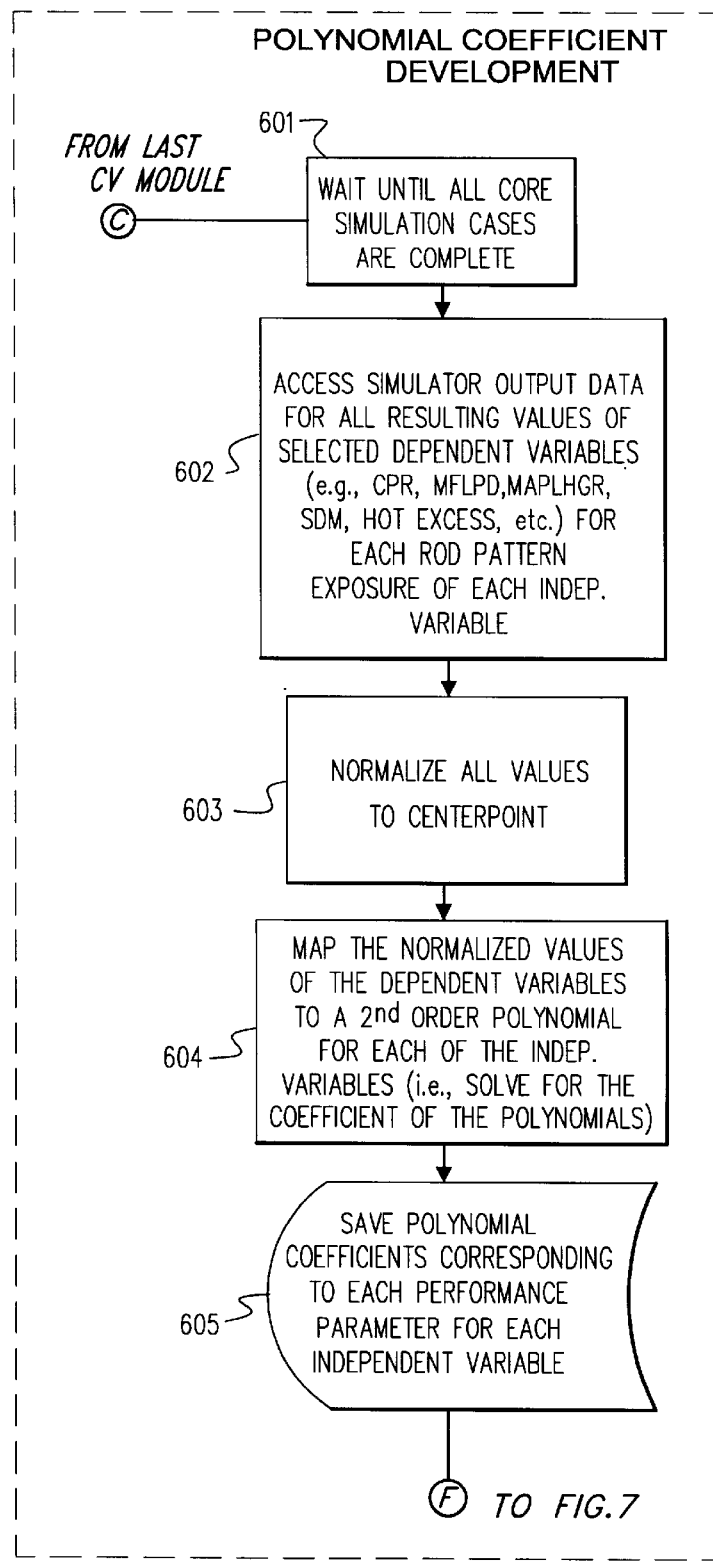
FIG. 6 is a flowchart illustrating functional program control steps performed by a polynomial coefficient development module in an example software embodiment of the present invention.

FIG. 6 shows example functional program control steps for developing polynomial coefficients for mapping each simulation case to a polynomial that fits the three data values for each independent variable case (i.e., the upper, lower and center-point values). At functional step 601, further processing is delayed until all of the simulation cases are complete and the response surface has been updated. Next, at steps 602 and 603, the response surface is accessed and all the simulation data produced by control-variable modules 302 is normalized to the center-point case data. Next, at functional step 604, coefficients are determined for defining a unique second-order polynomial that fits the three normalized simulation case values for each independent control-variable. However, since the evaluation of certain control-variables (for example, fuel bundle axial characteristics) can often produce results that are much greater than the allowed breadth for that control-variable, core simulation results for these type of variables are stored in the response surface as discrete first order evaluations and are not mapped to polynomials. Finally, at step 605, the coefficients for each polynomial are saved and further processing continues with the polynomial optimization and evaluation module.

Figure 7:
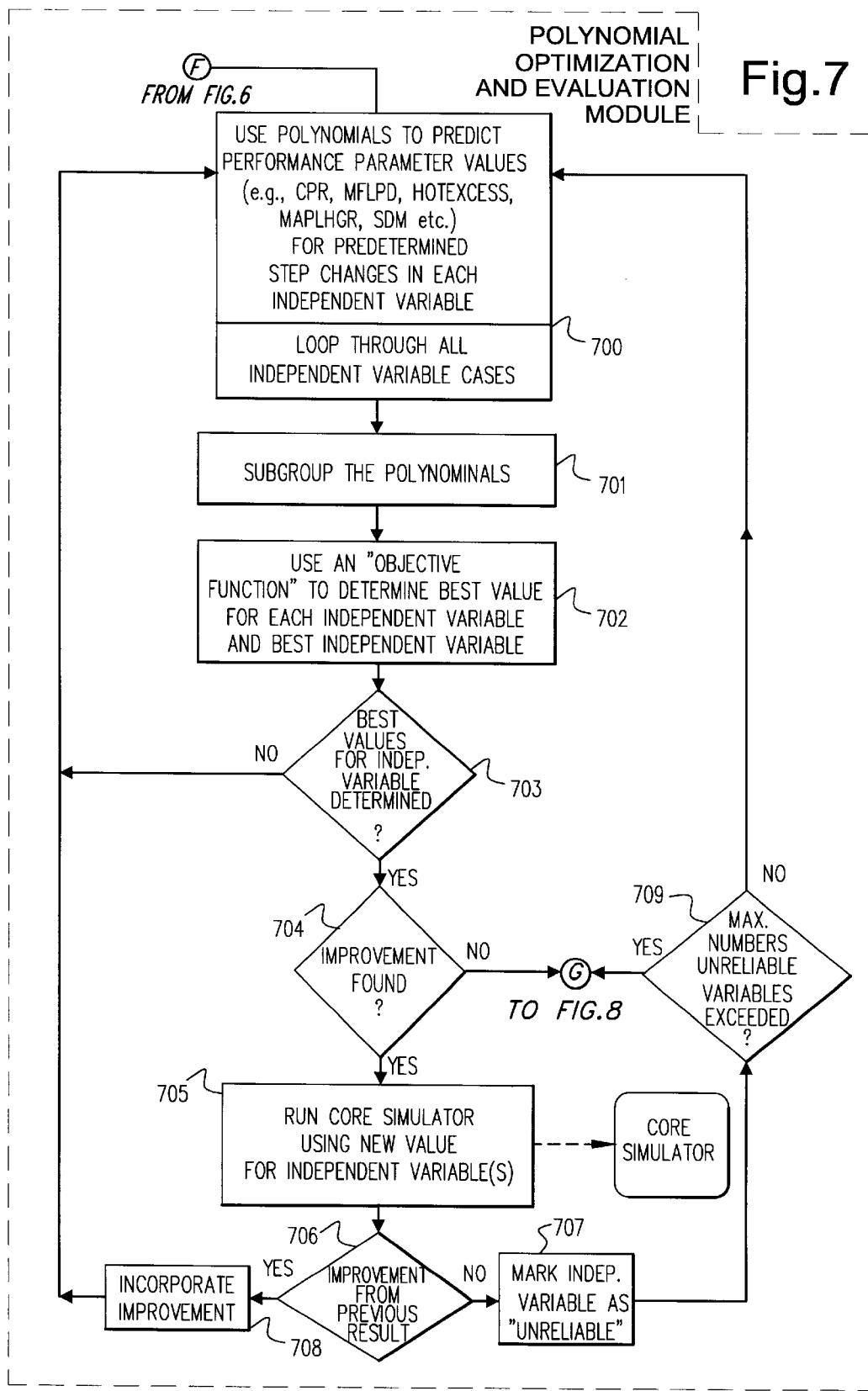
FIG. 7 is a flowchart illustrating functional program control steps performed by a polynomial usage module in an example software embodiment of the present invention.

FIG. 7 shows example functional program control steps for polynomial optimization and evaluation module 304.

This module examines reactor performance parameter values predicted by each of the second-order polynomials associated with each control-variable to determine which control-variable and value produces the most significant improvement in reactor performance. At steps 700 and 701, polynomials developed from each of the control-variable simulation cases are accessed from the response surface, sub-grouped and used to predict quantitative values for performance parameters (e.g., CPR, MFLPD, MAPLHGR, SDM, etc.) over the breadth of allowable values for that control-variable. In other words, a control-variable is selected and the polynomials associated with each of the performance parameters as influenced by that control-variable are used to predict a set of performance parameter values indicative of reactor performance for each of a predetermined number of discrete incremental changes in the value of the selected control-variable over the breadth (i.e., range of predetermined permissible values) of the control-variable. This process is repeated for every independent control-variable.

Under a principle generally known in the art as "superposition", the net effect of a plurality of changes made to different control-variables together in combination can be determined by the summation of the effects of the individual control-variable changes made separately. Accordingly, at the initialization and input stage (i.e., when cycle specific inputs and design basis considerations are identified, e.g., as discussed above with respect to steps 401 and 402 of the Initialization Module in FIG. 4), a user of the present system may select an optimization. "resolution" level as input option that permits changes to quantitative operational values for more than one independent variable to be evaluated in combination with each other. Consequently, if this option was previously selected, then, at step 700, the individual polynomial-predicted effects of every combination of a selected plurality of independent control-variables are summarily combined to quantitatively determine the net effect that a plurality of changes to different control-variables made together would have on each of the many reactor core performance parameters. The higher the selected resolution level, the more independent control-variables are evaluated together in combination and, hence, the greater the probability of detecting a combination that will improve reactor performance. For example, at a selected optimization resolution level of "three", a change in the quantitative values for three different independent control-variables and every combination of three control-variables out of the total number of control-variables considered would be evaluated. All discrete changes among the plurality of control-variables under a particular resolution are examined using the associated polynomial predictors for each control-variable.

Although higher resolution levels may require somewhat longer processing times than lower resolution levels, the total processing time is significantly less than conventional methods because the polynomial predictors are used and combined accordingly instead of performing actual computer simulations of the reactor core for each case. In this manner, the method of the present invention, as exemplified by the present embodiment, is essentially exhaustive and is almost guaranteed to identify the global optimum fuel-cycle design. While very high resolution levels may not be feasible in practice due to the extended processing time required, the capacity of the present invention to permit selection of a particular resolution level enables the system user to selectively quantify a degree of "closeness" to the true absolute optimum which is desired to be achieved.

Next, at step 702, for each quantitative value change made to a individual control-variable or combination of control-variables (i.e., the "independent" variables), an "objective function" test is used to quantify the relative "worth" or "strength" of that change in terms of its effect on improving the performance parameters (i.e., the "dependent" variables). The objective function sets a particular limiting value for each performance parameter that is determined primarily through an integration of performance "violations" relative to defined design limits, offset by the integration of any performance "credits" associated with beneficial results such as additional energy, increased thermal margin, etc. Pre-determined multipliers (i.e., mathematical factors) are applied to design limit values for each of the performance parameters—such as, for example, SDM, Hot Excess, MFLPD, MAPLHGR, etc.—to provide normalization and relative ranking of each parameter. Basically, in step 702, each predicted performance parameter value is tested using an objective function, fashioned in accordance with conventional knowledge and practice in the art, to determine the best set of control-variable polynomial predictors for optimizing core performance.

At step 703, the best values for the control-variable(s) are identified. Since each polynomial predictor corresponds to a specific control-variable, polynomial predictors are compared, as rated by the objective function of step 702, and reiteration of steps 700–702 continues until the best values for the control-variable(s) have been identified. Next, at step 704, the control-variable values are compared with the values obtained from previous iterations (if any) to determine if any improvement is found to exist. If no improvement is detected, processing continues with the steps shown in FIG. 8. If some improvement is found to exist, a core simulator input case is prepared using the improved values from the selected best polynomial predictor(s) corresponding to one or more control-variables and a core simulation is executed, as indicated at step 705.

Although the use of polynomials allows for a rapid prediction of what changes may constitute an improvement in reactor performance, the core simulation at step 705 provides calibration between the simulation process and the polynomial coefficient data in the response surface. Essentially, it allows for verifying the predicted improvement by providing "actual" (as opposed to "predicted") core simulation data documenting the operation of the core under the improved control-variables. At step 706, the core simulation results of step 705 are compared with the core simulation results from the center-point case (or the results of previous optimizations) to determine if any improvement to core performance has resulted. If the results from the step 705 core simulation show an improvement over the center-point case, the improvement is incorporated and the process is repeated again, as indicated at step 708. If the results of the core simulation at step 705 is not improved, the corresponding control-variable(s) is considered as "unreliable" and marked as such at step 707. Once a predetermined number of unreliable control-variables is exceeded, as tested at step 709, polynomial optimization and evaluation ceases and processing continues with the steps shown in FIG. 8.

Figure 8:
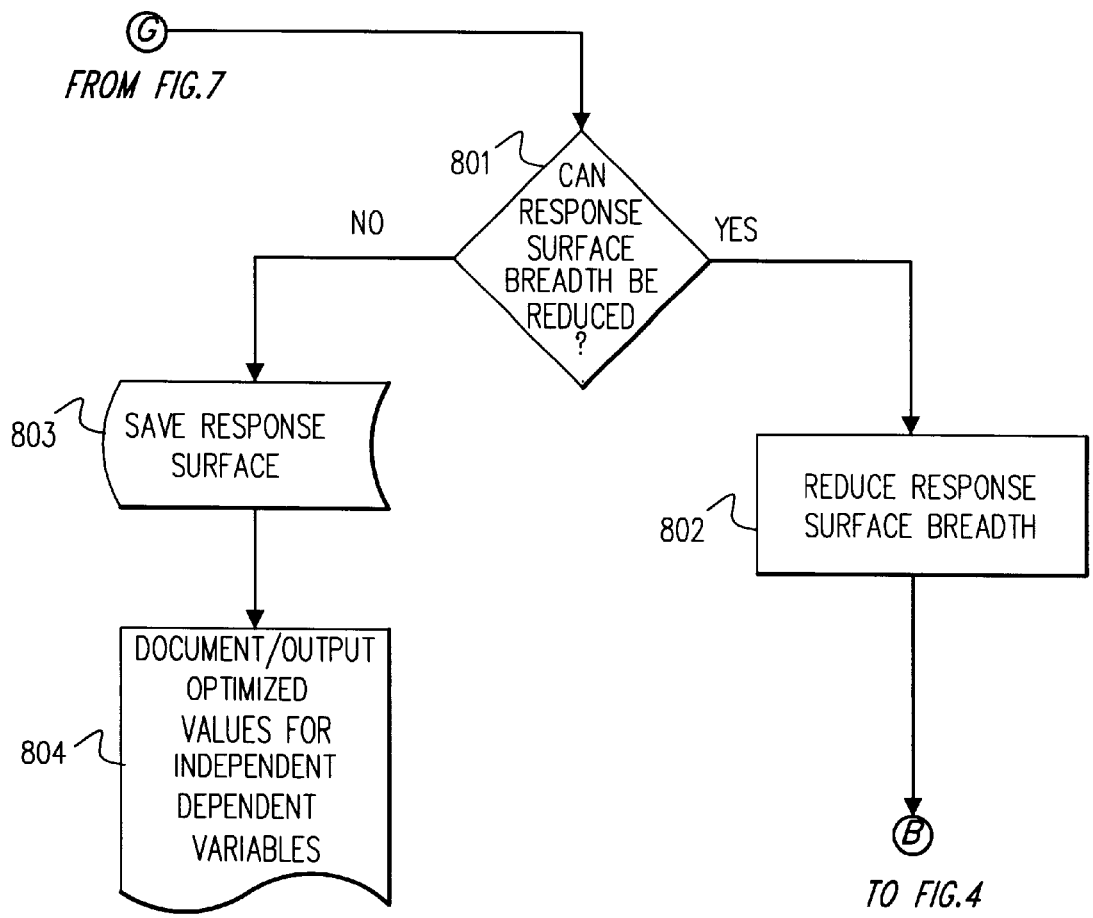
FIG. 8 is a flowchart illustrating functional program control steps for saving and modifying response surface results in an example software embodiment of the present invention.

FIG. 8 shows example functional program control steps for Save/modify Response Surface Module 305. First, the current "breadth" of the response surface is examined at step 801 (i.e., the breadth of the response surface in terms of the range of control-variable values explored). If a reduction in the predetermined range of values used by the CV modules in creating simulation cases for the control-variables is feasible, then that range is decreased and the creation of a new response surface is initiated using the original center-point case data. This is indicated at functional step 802 as reducing the response surface breadth. At this point, the optimization process of the present invention then starts over again creating this "new" response surface using one or more of the various control-variable modules, as indicated by entry point "B" in FIG. 4. If reducing the "breadth" of control-variable values used by the CV modules is not feasible, the current response surface data is documented (saved) and the optimized control-variable values are output, as indicated by steps 803 and 804.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A design method for nuclear reactor fuel management, comprising:

first simulating nuclear reactor operation for sets of independent control variable values to produce associated sets of dependent performance variable values;

generating polynomials based on the sets of independent control variable values and the sets of dependent performance variable values, the polynomials representing relationships between the independent control variables and the dependent performance variables;

generating additional sets of dependent performance variable values for additional sets of independent control variable values using the generated polynomials; and determining a set of independent control variable values for possible use in operating a nuclear reactor based on the sets of dependent performance variable values and the additional sets of dependent performance variable values.

2. The method of claim 1, wherein the first simulating step simulates nuclear reactor operation for more than one set of independent control variable values concurrently.

3. The method of claim 1, wherein the first simulating step comprises:

simulating nuclear reactor operation for a base set of independent control variable values to produce a base set of dependent performance variable values;

generating, from the base set of independent control variable values, at least first and second modified sets of independent control variable values associated with each independent control variable in a selected group of independent control variables; and simulating nuclear reactor operation for each of the first and second modified sets of independent control variable values to produce first and second modified sets of dependent performance variable values.

4. The method of claim 3, wherein the generating step, for each independent control variable in the selected group, modifies the independent control variable value in the base set by a first offset to create the first modified set and modifies the independent control variable value in the base set by a second offset to create the second modified set.

5. The method of claim 4, wherein the first offset increases the independent control variable value and the second offset decreases the independent control variable value.

6. The method of claim 3, wherein the generating polynomials step generates a set of polynomials for at least each independent control variable in the selected group based on the base, first modified and second modified sets of independent control variable values and the base, first modified and second modified sets of dependent performance variable values, each polynomial representing a relationship between one of the independent control variables in the selected group and one of the dependent performance variables.

7. The method of claim 6, wherein the generating polynomials step comprises:

normalizing each of the first modified and second modified sets of dependent performance variable values with respect to the base set of dependent performance variable values; and generating the polynomials based on the base, first modified and second modified sets of independent control variable values and the base, normalized first modified and normalized second modified sets of dependent performance variable values.

8. The method of claim 6, wherein the generating polynomials step comprises:

normalizing each of the first modified and second modified sets of dependent performance variable values with respect to the base set of dependent performance variable values; and mapping relationships between each of the independent control variables in the selected group and each of the dependent performance variables to a polynomial based on the base, first modified and second modified sets of independent control variable values and the base, normalized first modified and normalized second modified sets of dependent performance variable values.

9. The method of claim 8, wherein the polynomials are second order polynomials.

10. The method of claim 8, further comprising:

storing the coefficients of the polynomials as a response surface.

11. The method of claim 10, wherein the generating additional sets step generates the additional sets using the response surface.

12. The method of claim 11, wherein the generating additional sets step generates at least one additional set of dependent performance variable values that corresponds to a set of independent control variable values where more than one independent control variable has a value that differs from that in the base set of independent control variable values.

13. The method of claim 12, wherein the generating additional sets step generates the additional sets of dependent performance variable values for exhaustive sets of independent control variable values between the first and second offsets associated with each independent control variable value.

14. The method of claim 1, wherein the generating additional sets step generates at least one additional set of dependent performance variable values that corresponds to a set of independent control variable values representing changes in more than one independent control variable value.

15. The method of claim 14, wherein the generating additional sets step generates the at least one additional set of dependent performance variable values that corresponds to a set of independent control variable values representing changes in more than one independent control variable value by superposition of results from more than one polynomial.

16. The method of claim 1, wherein the generating additional sets step generates the additional sets of dependent performance variable values for exhaustive sets of independent control variable values between a selected range for each independent control variable in a selected group of independent control variables.

17. The method of claim 1, wherein the determining step comprises:
    applying an objective function to at least a selected group of the additional sets of dependent performance variable values; and
    selecting a set of independent control variable values based on the objective function values.

18. The method of claim 17, further comprising:
    second simulating nuclear reactor operation for the selected set of independent control variable values; and
    deciding whether the selected set of independent control variable values provides an improvement in nuclear reactor operation based on results of the second simulating step.

19. The method of claim 18, further comprising:
    marking the selected set of independent control variable values as not a verified improvement when the deciding step decides no improvement; and
    repeating the selecting, the second simulating and deciding steps after the removing step.

20. The method of claim 19, wherein the selected group includes sets of dependent performance variable values corresponding to sets of independent control variable values meeting a desired resolution, the desired resolution indicating a number of independent control variables having their value changed in forming a set of independent control variable values.

21. The method of claim 18, wherein:
    the first simulating step includes,
        simulating nuclear reactor operation for a base set of independent control variable values to produce a base set of dependent performance variable values;
        generating, from the base set of independent control variable values, at least first and second modified sets of independent control variable values associated with each independent control variable in a selected group of independent control variables; and
        simulating nuclear reactor operation for each of the first and second modified sets of independent control variable values to produce first and second modified sets of dependent performance variable values; and
    further comprising,
    repeating the generating additional sets, the determining, the second simulating and the deciding steps using the selected set of independent control variable values as the base set of independent control variable values when the deciding step decides the produced set of independent control variable values provides an improvement.

22. The method of claim 18, wherein
    the first simulating step simulates reactor operation for a base set of independent control variable values to produce a base set of dependent performance variable values, generates first modified and second modified sets of independent control variable values corresponding to each independent control variable in a selected group of independent control variables, and simulates reactor operation for each of the first modified sets of independent control variable values and each of the second modified sets of independent control variable values to produce associated sets of dependent performance variable values, the first modified sets having the value of the corresponding independent control variable incremented by a first offset and the second modified sets having the value of the corresponding independent control variable decremented by a second offset.

23. The method of claim 22, further comprising:
    reducing a range defined by the first offset and second offset corresponding to at least one of the independent control variables when the deciding step decides the selected set of independent control variable values does not provide an improvement; and
    repeating, after the reducing step, the first simulating, the generating polynomials, the generating additional sets, the determining, the second simulating and the deciding steps.

24. The method of claim 23, further comprising:
    determining, prior to the reducing step, whether a range defined by the first offset and second offset corresponding to at least one of the independent control variables is permitted; and
    outputting the set of independent control variable values corresponding to the set of dependent performance variable values obtained through simulation that have the highest object function value when the determining step determines no further reductions are permitted.

25. The method of claim 24, wherein the selected group includes sets of dependent performance variable values corresponding to sets of independent control variable values meeting a desired resolution, the desired resolution indicating a number of independent control variables having their value changed in forming a set of independent control variable values.

26. The method of claim 1, wherein the determining step determines at least one set of independent control variable values based on application of an objective function to the sets of dependent performance variable values and the additional sets of dependent performance variable values.

27. The method of claim 26, wherein the determining step confirms the at least one determined set of independent control variable values through simulation.

28. The method of claim 17, wherein the selected group includes sets of dependent performance variable values corresponding to sets of independent control variable values meeting a desired resolution, the desired resolution indicating a number of independent control variables having their value changed in forming a set of independent control variable values.

29. A design method for nuclear reactor fuel management, comprising:
    first simulating nuclear reactor operation for sets of independent control variable values to produce associated sets of dependent performance variable values;
    generating polynomials based on the sets of independent control variable values and the sets of dependent performance variable values, the polynomials representing relationships between the independent control variables and the dependent performance variables;
    using the polynomials to obtain sets of dependent performance variable values based on corresponding sets of independent control variable values;
    applying an objective function to sets of the dependent performance variable values; and
    selecting at least one set of independent control variable values based on the objective function values;
    first simulating nuclear reactor operation for the produced set of independent control variable values; and
    deciding whether the produced set of independent control variable values provides an improvement in nuclear reactor operation based on results of the simulating step.

30. The method of claim 29, wherein, in the obtaining step, the sets of independent control variable values are derived from a base set of independent control variable values.

31. The method of claim 30, further comprising:
repeating the obtaining, applying, selecting, first simulating and deciding steps using the selected set of independent control variable values as the base set of independent control variable values when the deciding step decides the selected set of independent control variable values provides an improvement.

32. The method of claim 31, further comprising:
establishing polynomials based on the base set of independent control variable values, the polynomials representing a relationship between each independent control variable in a selected group of independent control variables and each dependent performance variable; and wherein
the obtaining step derives the sets of dependent control variable values based on the polynomials for variations in at least each independent control variable in the selected group within a value range associated with that independent control variable.

33. The method of claim 32, further comprising:
reducing the value range corresponding to at least one of the independent control variables when the deciding step decides the selected set of independent control variable values does not provide an improvement; and
repeating, after the reducing step, the obtaining, applying, selecting, first simulating and deciding steps.

34. The method of claim 33, further comprising:
determining, prior to the reducing step, whether a range defined by a first offset and a second offset corresponding to at least one of the independent control variables can be reduced; and
outputting the set of independent control variable values corresponding to the set of dependent performance variable values obtained through simulation that has the highest objective function value.

35. The method of claim 29, further comprising:
marking the selected set of independent control variable values as not a verified improvement when the deciding step decides no improvement; and
repeating the obtaining, the applying, the selecting, the first simulating and deciding steps after the removing step.

36. The method of claim 35, wherein the applying step applies the objective function to at least a selected group of the sets of dependent performance variable values, the selected group includes sets of dependent performance variable values corresponding to sets of independent control variable values meeting a desired resolution, the desired resolution indicating a number of independent control variables having their value changed in forming a set of independent control variable values.

37. The method of claim 29, further comprising:
simulating reactor operation for a base set of independent control variable values to produce a base set of dependent performance variable values;
generating first modified and second modified sets of independent control variable values corresponding to each independent control variable in a selected group of independent control variables, the first modified sets having the value of the corresponding independent control variable incremented by a first offset and the second modified sets having the value of the corresponding independent control variable decremented by a second offset; and
simulating reactor operation for each of the first modified sets of independent control variable values and for each of the second modified sets of independent control variable values to produce associated sets of dependent performance variable values.

38. The method of claim 37, further comprising:
generating polynomials based on the sets of independent control variable values and the sets of dependent performance variable values, the polynomials representing relationships between the independent control variables and the dependent performance variables; and wherein
the obtaining step generates additional sets of dependent performance variable values for additional sets of independent control variable values using the generated polynomials.

* * * * *